Nov. 10, 1959   E. P. MacDONOUGH   2,912,190
VARIABLE-CONTOUR AIRFOIL
Filed May 5, 1958

Edward P. MacDonough
INVENTOR.

BY H.C. Goldwire
AGENT.

United States Patent Office 2,912,190
Patented Nov. 10, 1959

2,912,190

VARIABLE-CONTOUR AIRFOIL

Edward P. MacDonough, Dallas, Tex., assignor to Chance Vought Aircraft, Incorporated, Dallas, Tex., a corporation of Delaware Application May 5, 1958, Serial No. 732,980

10 Claims. (Cl. 244—44)

The present invention relates to variable-camber airfoils and aircraft wings and more particularly to an improved leading edge construction and arrangement for changing the contour of the leading edge of an airfoil.

It is frequently desirable in aircraft to vary the profile or contour of an airfoil or wing in order to change flight characteristics under certain operating conditions. A number of arrangements have heretofore been proposed for varying the contour or camber of an airfoil, especially in its leading edge portion, and the present invention is directed to an improved airfoil leading edge with a controllable nose contour which, in response to pilot-operated or automatic control, is caused to assume either a sharp, short-radius nose profile or alternatively a drooped, bulbous nose profile. The sharp profile is particularly well adapted for high-speed supersonic flight, and the drooped, bulbous profile serves to increase the lift-drag ratio of the airfoil and to decrease tendencies toward leading-edge stall during takeoff, landing, low-speed flight, and maneuvers at relatively low speeds.

Previously proposed variable-contour airfoil nose sections have utilized non-stretchable diaphragms or stretchable boots mounted on the lower surface at the leading edge of the airfoil and inflatable to provide (at least under static conditions) a structure changing the leading edge from a relatively sharp, short-radius contour to a bulbous, drooped contour. During times when the aircraft has little or no forward speed, as at the beginning of a take-off run, such devices can provide the desired arcuate contour which, if the device is large enough to effect a significant change in the airfoil contour and, if its arcuate, bulbous shape is maintained under airloads, implements desirable improvements in the lift characteristics of the airfoil under certain operating conditions. A failing in such constructions, however, lies in their relative inability to resist excessive deformation under the forces imposed upon them by the relative wind or airstream. Thus, a structure formed by an inflated diaphragm or boot and displaying in cross section an arcuate (for example, a semi-circular) contour under zero airload tends at takeoff and higher speeds of the aircraft to be deformed on its forward side by forces which also tend to shift the entire inflated structure to the rear. This deformation disadvantageously changes the shape of the bulbous, drooped leading edge and reduces its effectiveness.

In addition, serious mechanical problems must be faced in such constructions. The diaphragm or boot must be inflatable and hence movable relative to the airfoil surface. To this end, use has been proposed of a stretchable boot made of a material which will return by its own elasticity to a retracted position when the inflating pressure is released. This has been found undesirable since the degree of extension of the boot from the airfoil depends upon the inflating pressure, and in the absence of a very precise degree of control over the latter, is unpredictable since there is no set limit, inherent as such in the material, to the stretching of the material. In addition, unless the boot material is very heavy and bulky, it is very difficult to match its stretchability to the pressure required for its proper extension in a manner wherein the inflating pressure is sufficient to render the inflated structure firm and substantially rigid. Inflated, non-stretchable diaphragms, as noted above, are also subject to deflection under air loads, and although they may be inflated by heavier pressures without exceeding a desired extension from the airfoil and are in this respect an improvement on a stretchable boot, upon deflation of a diaphragm there must be faced the problem of its efficient stowage in a manner wherein the airfoil is returned to its contour best suited for high-speed flight.

The improved contour-changing arrangement of the present invention includes an elongated, flap-like member extending spanwise of an airfoil nose section and pivotally mounted on the latter aft of its leading edge. Means are supplied for pivoting this member between a first position wherein it extends downwardly from the nose section and a second position into which it is moved rearwardly from the first. An elongated, spanwise recess provided in the airfoil lower surface is entered by the member when the latter is moved to its second position. A flexible, substantially non-stretchable diaphragm has an aft edge portion attached in a pressure-tight manner to the elongated pivotable member and a forward edge similarly attached to the nose section forwardly of the pivotable member and elongated recess. Intermediate these areas of attachment, the diaphragm has a surface adjacent and free from attachment to the pivotable member and nose section. The pivotable member has a first surface which faces forwardly when the member is in its first position and opposite thereto a second, curved surface which meets the first surface at the trailing edge of the member. Throughout at least a major portion of its area, the second surface is curved in a manner matching the desired arcuate shape of the drooped, bulbous structure, and to this portion of the second surface the diaphragm may be adhesively bonded or otherwise firmly attached as may be desired in order to provide, for the diaphragm, support additional to that provided by its attachment at its extreme aft edge to the pivotable member. When the member is pivoted rearwardly to its second position, a rearward portion, such as the trailing edge, of the member places a rearward pull on the diaphragm and moves the latter into a taut, jacketing relation with the nose section and pivotable member. Slack introduced into the diaphragm by motion of the pivotable member when the latter is brought to its first position allows the diaphragm to be inflated, by means described below, to an arcuate contour generally continuous with the curved, rigid second surface of the pivotable member. The problem of stowage of the diaphragm is eliminated since the latter, when deflated, is pulled tightly against the outer surfaces of the nose section and pivotable member. Since a fraction of the arcuate contour provided jointly by the inflated diaphragm and extended member is rigidly established by the latter, the well-supported diaphragm is less subject to deformation by air-imposed forces.

It is, accordingly, a major object of this invention to provide an improved variable-camber construction and mechanism for varying the contour of the leading edge of an airfoil or wing by the use of a pivotally mounted member extensible from the airfoil in association with an inflatable diaphragm covering surfaces of the member and of the airfoil nose section.

Another object is to provide a variable-contour mechanism which is capable of providing a sharp, short-radius nose profile adapted for supersonic flight or a blunt, longer-radius, drooped profile which increases the lift-drag ratio of the airfoil and is more particularly adapted for takeoff, landing, and low-speed maneuvers.

Yet another object is to provide a diaphragm inflatable from and retractable into close, jacketing relationship with the exterior surface of an airfoil without the necessity of retracting slack portions of said diaphragm into the airfoil interior or resorting to the use of a stretchable material for forming the diaphragm.

Other objects and advantages will be apparent from the specification and claims and from the accompanying drawing which illustrates an embodiment of one form of the invention.

Figure 1:
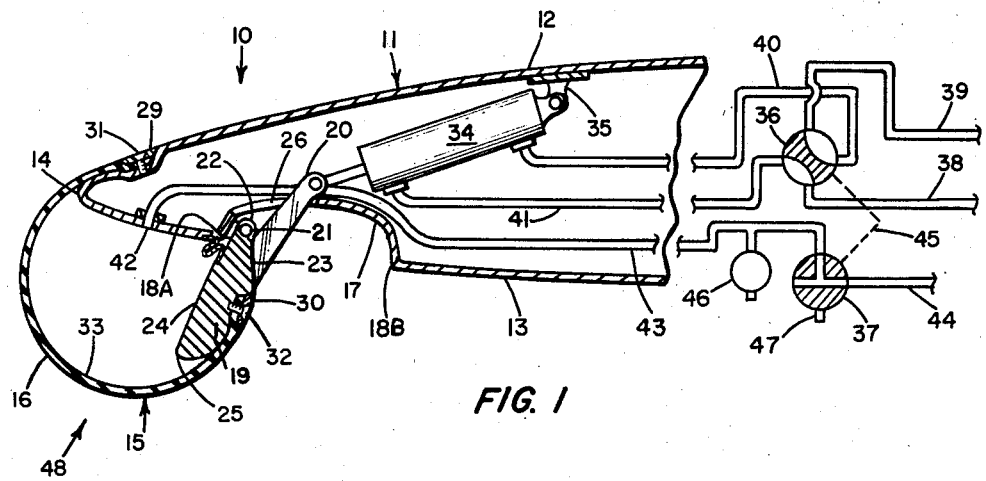
Figure 1 is a cross-sectional view of the leading edge of an airfoil with the variable-contour mechanism shown in its extended position.

With reference now to the drawing, an airfoil nose section 10 has a skin 11 which defines the upper and lower surfaces 12, 13 and the forwardmost point of extension or leading edge 14 of the airfoil. Construction of the nose section 10 is such that the skin 11 is rigidly fixed; hence, the upper and lower surfaces 12, 13 established thereby define a basic shape which is characterized by a relatively sharp, short-radius, droop-free contour at the leading edge 14.

Mounted on the nose section 10 is a diaphragm 15 which, when inflated, defines at least a major portion of an arc whose forward end lies at or immediately adjoining the basic leading edge 14 and which marks the desired cross-sectional size and shape of a bulbous structure 48 provided by the invention under the basic leading edge for endowing the airfoil nose section 10 with a blunt, long-radius leading edge 16 drooped below the median chord plane of the nose section. The radius of and the number of degrees included in the arc defined by the bulbous structure 48 will vary with specific characteristics of any airfoil nose section to which the invention is applied, and since this arc must be determined in each individual case according to well-known aerodynamic principles, it is not possible to supply specific dimensions therefor, nor are these necessary herein, since they must be determined individually according to the needs of any particular airfoil for which the benefits of the invention are to be provided. Aerodynamic principles usuable in determining the size of the arc are well known to those versed in the art. With the arc determined, its portion intersecting and lying immediately below the basic contour of the lower surface 13 (as unmodified by the recess 17 described below) is instrumental in defining the rear surface of the member 19.

Figure 3:
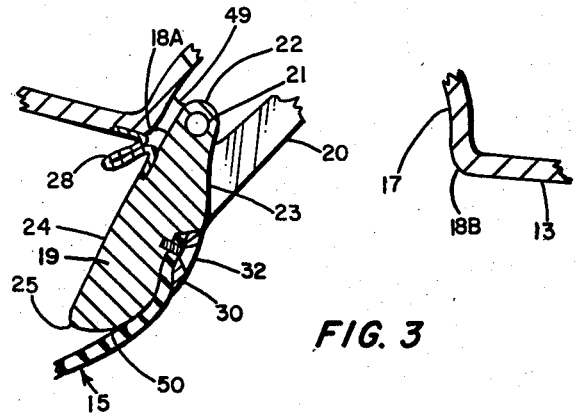
Figure 3 is an enlarged view of the pivotable member, seal, and parts of the nose section skin and diaphragm.

The flap-like pivotable member 19 is elongated, has leading and trailing edges 22, 25, and (as shown in Figure 3) is pivotally mounted near its leading edge 22 by, for example, a pin 21 pivotally connecting it, through a lug or bracket 49, to the nose section 10. The member 19 extends spanwise of at least a major portion of the nose section 10 and lies rearwardly of the nose section leading edge 14 by such a distance that, when pivoted to its first, downwardly extending position (Figure 1), at least a major part of its first surface 23 coincides with the desired arc to be defined by the bulbous structure 48, of which the member 19 thus forms a part, the balance being formed (as will be described) by the diaphragm 15. The pivotable member 19 leading and trailing edges 22, 25 are joined by a second surface 24 lying opposite the first surface 23. In the first position of the member 19, shown in Figure 1, the first surface 23 faces rearwardly and the second surface 24 faces forwardly relative to the airfoil nose section 10.

The diaphragm 15 may be made of any suitable material which is flexible, substantially non-stretchable, and capable of forming part of an airtight enclosure. A few examples include a thin metallic sheet material, a fabric filled with a plastic material, a solid plastic sheet, or still other materials adaptable for the purpose. The diaphragm 15 overlies the outer surface of the nose section 10 and is attached in a leakproof manner thereto forwardly of the opening 17 and pivotable member 19. In the example shown, a forward edge of the diaphragm 15 is rigidly and sealingly attached to the upper skin portion 12 by a clamping strip 29 and fasteners 31 just aft of the nose section leading edge 14, the skin 12 preferably being joggled and the clamping strip 29 bevelled to provide, with the diaphragm 15, a smoothly continuous outer surface. Extending forwardly from the clamping strip 29, the diaphragm 15 is wrapped around the leading edge 14, from which point it extends rearwardly and exteriorily of the nose section 10 over the second surface 23 to a point of pressure-tight (i.e., substantially leakproof) attachment with the pivotable member 19. This last attachment conveniently is made by wrapping the diaphragm 15 around the pivotable member trailing edge 25 onto the first surface 23 and attaching it to the latter by a clamping strip 30 and fasteners 32 as shown in Figure 3. The point of attachment of the aft edge of the diaphragm 15 to the pivotable member 19 is not important as long as the attachment lies outside (or at least aft of a major portion) of the second surface 24.

Refer to Figure 3. In order that the diaphragm 15, when positioned as shown in Figure 1, may supply a contour substantially continuous with the portion of the curved first surface 23 corresponding to a portion of the arc defined by the bulbous structure 48, the first surface 23 may be stepped aft of the clamping strip and in accordance with the thickness of the diaphragm 15. At a desired point 50 to the rear of (or, as shown in Figure 1, below) the clamping strip, the first surface 23 may depart from the arcuate shape adopted in conformance with the desired arcuate shape of the inflated structure 48, and from this point it may curve more sharply to its juncture with the second surface 24. In all cases, the trailing edge 25 of the pivotable member 19 should preferably be curved and smooth enough to prevent chafing and breaking of the diaphragm 15.

Between the clamping strip 30 and point 50, the diaphragm 15 preferably is adhesively bonded to the second surface 24. Between the clamping strip 29 and point 50, the diaphragm 15 has an upper surface area 33 adjacent and free of attachment to the nose section 10 and member second surface 23.

To allow the member 19 to be pivoted from its first position (Figure 1) to its second position (Figure 2), a recess 17 is provided in the lower skin 13. The recess 17 preferably is formed without breaking or making openings in the skin 13 in order that excessive airflow will not be admitted into the interior of the nose section 10 because of the presence of the recess. The recess 17 should be large enough to allow substantially complete retraction of the pivotable member 19 thereinto, and the second surface 24 of the latter is shaped so that it, together with the diaphragm 15 by which it is covered, forms a smooth continuation of the nose section lower surface 13 and substantially bridges the recess 17. The recess 17 has a forward margin 18A (Figure 1) located aft of the nose section leading edge 14 and just forwardly of the pivot point 21 of the member 19, and further has an aft margin 18B. In order to compensate for the thickness of the diaphragm 15, the portion of the lower skin 13 lying forwardly of the recess 17 may be stepped upwardly by a distance corresponding to the gage of the diaphragm, thus providing the nose section 10 with a smooth contour when the pivotable member 19 is in its second position (Figure 2) and effectuating a flush relation between the diaphragm 15 and the skin 13 at the aft margin of the recess 17. The elongated recess 17 extends spanwise of the nose section and preferably is at least as long as the pivotable member 19. It should be provided with a suitable slot such as shown at 26 for accommodation of an arm 20 described below. To prevent excessive airflow therethrough, the dimensions of the slot 26 should be as small as practicable.

The pivotable member 19 has a rearward portion, for example the trailing edge 25, which engages the diaphragm 15 when the member 19 is pivoted rearwardly and places on the diaphragm 15 a rearward pull which brings it into tight, jacketing relation with the nose section 10 and member second surface 23 when the member 19 arrives in its second position. In this position, the trailing edge 25 or equivalent rearward portion of the member 19 holds the diaphragm 15 adjacent, i.e., substantially flush with, the part of the nose section lower skin portion 13 lying aft of the member's trailing edge 25. The inboard and outboard ends of the diaphragm 15 should be suitably attached to the nose structure 10 and/or pivotable member 19 in a manner wherein the diaphragm 15, nose section 10, and member 19 together form, in conjunction with a seal 28 (to be described), a reasonably airtight encloseure.

Where, in any particular embodiment of the invention, the selected form of the member 19 is such that a gap exists between the pivotable member's leading edge 22 and the wall of the recess 17 when the device is in its first position (Figure 1), and if this gap is so large that excessive leakage of air would occur therethrough, the seal 28 (Figure 3) may be provided to prevent the leakage. Any suitable and convenient sealing means may be employed, and the example shows a flexible strip 28 having a forward edge overlying the lower skin 13 just forwardly of the forward margin 18A of the recess 17 and an aft edge overlying the pivotable member's second surface 24, either or both edges of the seal 28 being firmly and sealingly attached to the respective surface 13 or 24 over which it lies.

Figure 2:
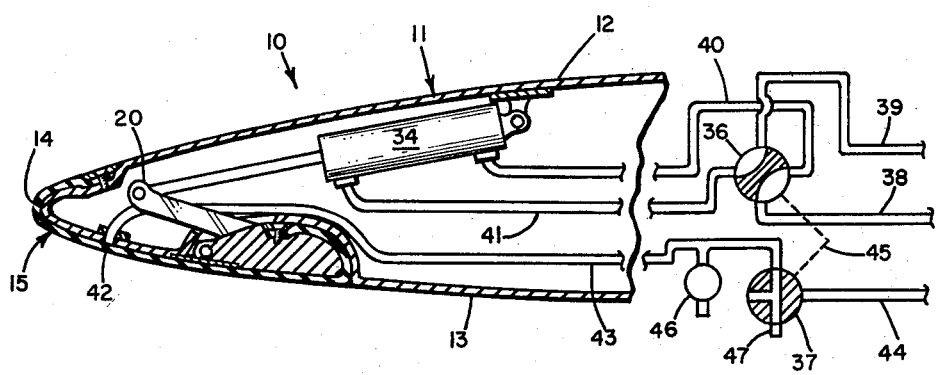
Figure 2 is a similar view of the same with the variable-contour mechanism shown in its retracted position.

The means for pivoting the member 19 between its first and second positions (Figures 1, 2) may be a motor energized electrically, hydraulically, etc. and controllable by a mechanism or an operator of the aircraft. In the example, this means is a hydraulic motor 34 which is mounted as by a fitting 35 in the nose section 10. The motor 34 is connected to the pivotable member 19 by an arm 20 rigidly attached to or integral at one of its ends with the first surface 23 of the pivotable member 19 and pivotally attached at its other end to the motor 34. The arm 20 extends into the interior of the nose section 10 through the slot 26 formed in the skin 13 at the recess 17. In some cases, the forward and downward pull exerted by the diaphragm 15 as it is inflated (by means to be described) is sufficient to effect movement of the member 19 from its second to its first position, in which case the motor 34 need be effective only for moving the member 19 from its second to its first position, in which to its second position (Figure 2). In some vehicles, such as an aircraft which is air-launched at relatively high speeds, the member 19 may be set manually in its second position before launching the aircraft and moved to its first position only for landing, in which case the motor 34 may be effective only for moving the member to its first position, or even entirely dispensed with if the pull exerted by the inflating diaphragm 15 can dependably effect the desired movement to the first position. In other cases, for example an aircraft designed for flight to destruction after launching or takeoff or otherwise not needing a bulbous, drooped leading edge for landing, the member 19 may be set manually in its first position prior to takeoff and the motor 34 need move the pivotable member thereafter only to its second position for high-speed flight. In still other cases, it is desirable that the member 19 be selectively movable by the motor 34 as desired from one to the other of its two positions; and where required, the motor 34 should be capable of effecting both these movements. For energization of the motor 34 shown, a hydraulic valve 36 is connected to pressure and return lines 38, 39 leading from a source of hydraulic pressure (not shown). Depending on whether, in any specific application, the motor 34 must extend and/or retract the member 19, the valve 36 is connected to the motor 34 by either or both the lines 40, 41. Positioning the hydraulic valve 36 as shown in Figure 1 directs hydraulic fluid through the line 41 to the motor 34 for effecting extension of the member 19, while fluid supplied through the line 40 when the valve 36 is positioned as shown in Figure 2 effects retraction of the member 19.

For inflation of the diaphragm 15, means are provided for supplying positive fluid pressures between the nose section lower surface 13 and member second surface 24 and the adjacent upper surface 33 of the diaphragm 15. In the specific example, an aperture 42 provides communication between the interior of the nose section 10 and the diaphragm upper surface 33 and preferably is located in the nose section lower skin 13 forwardly of the recess 17. It will be understood that the aperture 42 may alternatively be located in the second surface 24 of the pivotable member 19 by providing flexible connections to the air line 43. This latter is connected to the aperature 42 and is additionally supported in the nose section 10 as required by suitable clamps, etc. (not shown). The air line 43 leads to the aperture 42 from an air valve 37 which conveniently is of the three-way variety. When positioned as shown in Figure 1, air supplied to the valve 37 from a source of compressed air (not shown) through a tube 44 is directed to the upper surface 33 of the diaphragm 15 through the tube 43 and aperture 42, and when the hydraulic valve 36 is positioned for extension of the pivotable member 19, the slack thereby introduced into the diaphragm 15 is taken up by an inflating air pressure which extends the diaphragm to the position and arcuate contour shown in Figure 1. In this position, the diaphragm 15 and the first surface 23 of the pivotable member 19 together establish an arc which smoothly connects the nose section upper skin 12 at the clamping strip 29 with the lower surface 13 and establishes a bulbous, arcuate, drooped, leading edge 16. The hydraulic and air valves 36, 37 conveniently may be mechanically linked as at 45 in order that one motion of the operator may move both valves 36, 37 to or from their respective positions (Figure 1) corresponding to extension of the diaphragm 15 and pivotable member 19.

To prevent excessive pressures from being supplied to the diaphragm 15, a relief valve 46 may be connected to the line 43 and adjusted as needed to vent excess pressures.

When the hydraulic valve 36 is positioned as shown in Figure 2, the motor 34 effects retraction of the member 19, and the member's rearward portion, for example the trailing edge 25, engages the diaphragm 15 and pulls the latter rearwardly. The linkage 45 may be such that, at this time, the air valve 37 is positioned to allow air to be exhausted from the diaphragm 15 through the exhaust port 47 of the air valve 37; otherwise, the relief valve 46, where the latter is provided, may be depended upon to allow the escape of air and deflation of the diaphragm 15 as it moves to its second position, shown in Figure 2, wherein it snugly jackets the pivotable member second surface 24 and the nose section lower surface 13 forward thereof and, supported by the pivotable member 19, substantially bridges the elongated recess 17.

While only one embodiment of the invention has been described herein and shown in the accompanying drawing, it will be evident that various modifications are possible in the arrangement, shape, and construction of the variable-contour airfoil components without departing from the scope of the invention.

I claim:

1. For an airfoil nose section having a lower surface and a leading edge, a contour changing arrangement comprising: an elongated member pivotally mounted on said nose section aft and extending spanwise of said leading edge and pivotable between first and second positions, said member extending downwardly from said nose section when in said first position and pivoting rearwardly when moved from said first to said second position; a diaphragm attached in pressure-tight manner to said member and in similar manner to said nose structure in a region forward of said member; a rearward portion on said member holding said diaphragm taut and substantially flush, at said rearward portion, with said lower surface of said nose section when said member is in said second position; and means for supplying positive fluid pressures between said diaphragm and said member, whereby said diaphragm may be inflated to an extended position relative to said nose structure when said member is in said first position.

2. An arrangement such as claimed in claim 1 and further comprising motor means for pivoting said member between said first and second positions.

3. An arrangement such as claimed in claim 2, said nose structure having an elongated spanwise recess entered by said member when the latter is moved from said first to said second position.

4. For an airfoil nose section having a lower skin and a leading edge, a contour changing arrangement comprising: an elongated member pivotally mounted on said nose section aft and extending spanwise of said leading edge and pivotable between first and second positions, said member extending downwardly from said nose section when in said first position and pivoting rearwardly when moved from said first to said second position; an elongated recess in said lower skin located aft and extending spanwise of said leading edge, said recess being entered by said member when the latter is moved from said first to said second position; a diaphragm attached in pressure-tight manner to said member and in similar manner to said nose structure in a region forward of said member; a rearward portion on said member holding said diaphragm taut and substantially flush, at said rearward portion, with said lower skin of said nose section when said member is in said second position; and means for supplying positive fluid pressures between said diaphragm and said member, whereby said diaphragm may be inflated to an extended position relative to said nose structure when said member is in said first position.

5. An arrangement such as claimed in claim 4, said arrangement including actuating means for moving said member between said first and second positions.

6. For an airfoil nose section having a lower surface and a leading edge, a contour changing arrangement comprising: an elongated recess in said nose section rearwardly of and extending spanwise of said leading edge; an elongated member pivotally mounted on said nose section aft of and extending spanwise of said leading edge and movable between a first position wherein said member extends downwardly from said nose section and a second position wherein said member is substantially retracted into said recess, said member being rearwardly pivotable from said first to said second position; motor means for pivoting said member at least to said second position; a diaphragm attached in a pressure-tight manner to said member and similarly attached forwardly of said member to said nose structure, said diaphragm having a surface area adjacent and free from attachment to said nose section; means for exerting positive fluid pressures on said diaphragm, said means being mounted in said nose section and having communication with said diaphragm surface adjacent said nose section; and a rearward portion of said member engaging and placing a rearward pull on said diaphragm when said member is pivoted rearwardly, whereby, fluid pressure admitted thereto by said means for exerting positive fluid pressures inflates said diaphragm to an extended position relative to said nose structure when said member is in said first position, and movement of said member to said second position by said means for pivoting said member pulls said diaphragm into a location wherein it lies in snug, jacketing relation with said member and nose section and, at said rearward portion of said member, substantially flush with said lower surface of said nose section.

7. For an airfoil nose section having a leading edge, a contour changing arrangement comprising: an elongated recess in said nose section rearwardly of and extending spanwise of said leading edge; an elongated member pivotally mounted on said nose section aft of and extending spanwise of said leading edge and movable between a first position wherein said member extends downwardly from said nose section and a second position wherein said member is substantially retracted into said recess, said member being rearwardly pivotable from said first to said second position; motor means for pivoting said member at least to said first position; a diaphragm attached in a pressure-tight manner to said member and similarly attached forwardly of said member to said nose section, said diaphragm having a surface area adjacent and free from attachment to said nose section; means for exerting positive fluid pressures on said diaphragm, said means being mounted in said nose section and having communication with said diaphragm surface adjacent said nose section; and a rearward portion of said member engaging and placing a rearward pull on said diaphragm when said member is pivoted rearwardly, whereby, when said member is in said second position, said diaphragm is held by said member in a location wherein it substantially bridges said elongated recess and, upon movement of said member to said first position by said means for pivoting said member and upon admission of fluid pressure to said diaphragm by said means for exerting positive fluid pressures, said diaphragm is inflated to an extended position relative to said nose structure.

8. An arrangement such as claimed in claim 7, said motor means for pivoting said member at least to said first position being selectively operative for pivoting said member to said second position.

9. For an airfoil nose section having a lower surface and a leading edge, a contour changing device comprising: an elongated recess in said lower surface aft of and extending spanwise of said leading edge, said recess having an aft margin; a flexible, substantially non-stretchable diaphragm having a forward edge and an aft edge; means for rigidly and sealingly attaching said forward edge to said nose section forwardly of said elongated recess; an elongated member extending spanwise of and pivotally mounted on said nose section rearwardly of said attaching means, said member being movable between a first position wherein it extends downwardly from said nose section and a second position, to the rear of the first, wherein it is substantially retracted into said recess; means for pivoting said member between said first and second positions; a portion of said diaphragm between said forward and aft edges extending rearwardly over said member exteriorily of said nose section, said portion having a surface adjacent said member and nose section lower surface; means for rigidly and sealingly attaching said aft edge of said diaphragm to said member whereby, when said member is retracted to said second position, said diaphragm is pulled taut over said nose section and said member by the latter and lies substantially flush with said nose section lower surface at said aft margin of said elongated recess; and means for supplying positive fluid pressures to said surface of said diaphragm adjacent said member and lower surface of said nose structure, whereby said portion of said diaphragm is inflated to an extended position relative to said nose structure when said member is moved to said first position.

10. For an airfoil nose section having a lower surface and a leading edge, a contour changing arrangement comprising: an elongated recess in said lower surface aft and extending spanwise of said leading edge, said recess having forward and aft margins; an elongated member extending spanwise of and pivotally mounted on said nose structure in the region of said forward margin of said recess, said member being pivotable between a first position wherein it extends downwardly from said nose section and a second position, to the rear of the first, wherein it is substantially retracted into said recess, said member having a first, curved surface facing rearwardly and a second surface facing forwardly when said member is in said first position and further having a trailing edge; means for pivoting said member between said first and second positions; a flexible, substantially non-stretchable diaphragm sealingly attached to said member in an area outside said second surface and extending forwardly from said trailing edge over said second surface, said diaphragm being sealingly attached to said nose section in a region located forwardly of said elongated recess and having an upper surface adjacent said nose section and member; and means for applying positive fluid pressures to said diaphragm upper surface, whereby said diaphragm may be inflated to an arcuate contour substantially continuous with said first, curved surface of said member when the latter is in said first position, and pivoting of said member to said second position pulls said diaphragm into tight, jacketing relation with said nose section lower surface and member second surface and into substantially flush relationship with said nose section lower surface at said aft margin of said opening.

References Cited in the file of this patent

UNITED STATES PATENTS

| | | |
|---|---|---|
| 2,297,951 | Frank | Oct. 6, 1942 |
| 2,851,229 | Clark | Sept. 9, 1958 |

FOREIGN PATENTS

| | | |
|---|---|---|
| 495,551 | Great Britain | July 4, 1919 |

UNITED STATES PATENT OFFICE
CERTIFICATE OF CORRECTION

Patent No. 2,912,190

November 10, 1959

Edward P. MacDonough

It is hereby certified that error appears in the printed specification of the above numbered patent requiring correction and that the said Letters Patent should read as corrected below.

Column 5, line 56, strike out "from its second to its first position, in which" and insert instead -- rearwardly from its first position (Figure 1) --.

Signed and sealed this 3rd day of May 1960.

(SEAL)
Attest:

KARL H. AXLINE
Attesting Officer

ROBERT C. WATSON
Commissioner of Patents